Dec. 24, 1968 R. W. SHREWSBURY 3,418,457
CRAZABLE TRANSLUCENT RECORD MEMBER
Filed July 2, 1964 2 Sheets-Sheet 1
FIG. 1
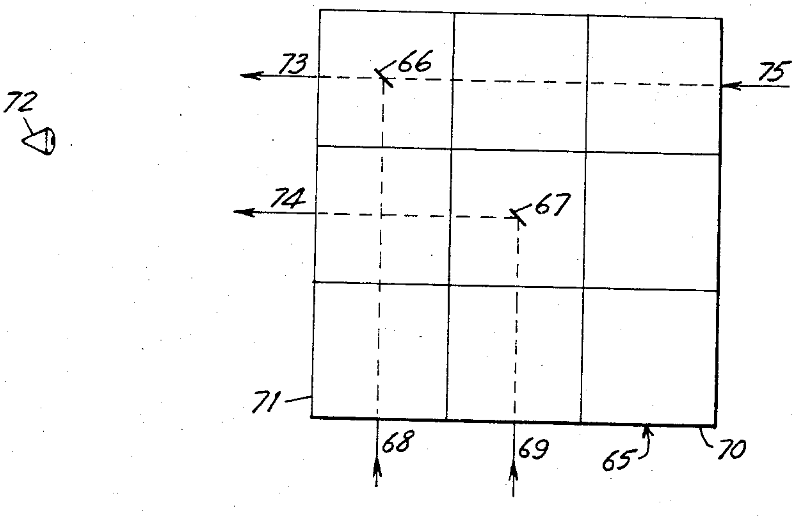
FIG. 2
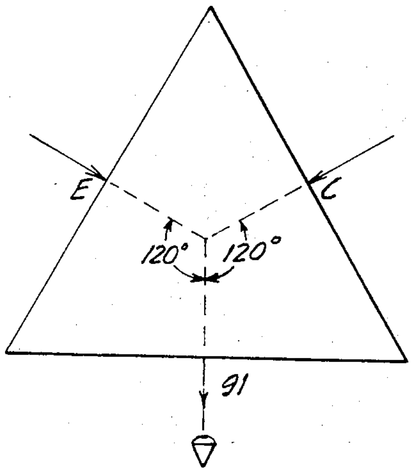
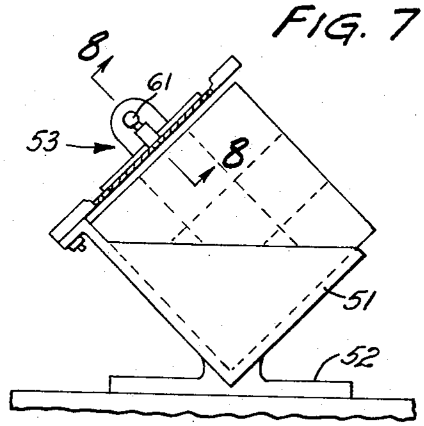
FIG. 8
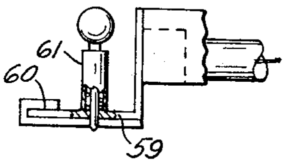
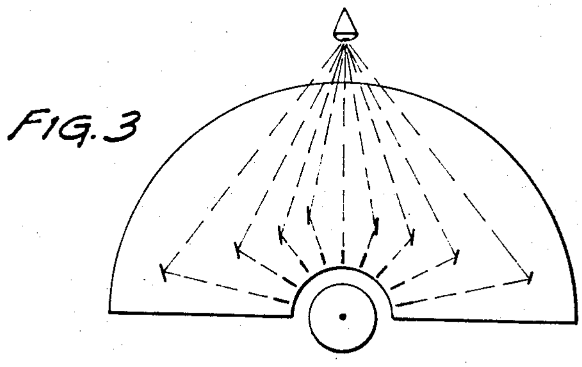
INVENTOR.
RAYMOND W. SHREWSBURY
BY
Carpenter, Abbott, Coulter, & Kinney
ATTORNEYS

CRAZABLE TRANSLUCENT RECORD MEMBER

Filed July 2, 1964 2 Sheets-Sheet 2

INVENTOR.
RAYMOND W. SHREWSBURY
BY
Carpenter, Abbott, Coulter & Kinney
ATTORNEYS

United States Patent Office 3,418,457

Patented Dec. 24, 1968

3,418,457

CRAZABLE TRANSLUCENT RECORD MEMBER

Raymond W. Shrewsbury, Roseville, Minn., assignor to Minnesota Mining and Manufacturing Company, St. Paul, Minn., a corporation of Delaware Filed July 2, 1964, Ser. No. 379,828

10 Claims. (Cl. 235—61.12)

ABSTRACT OF THE DISCLOSURE

An information storage and retrieval media including a translucent sheet-like member having edge portions of predetermined shape characteristics and an optical discontinuity formed in said material causing light entering said material at a first location along the edge portions to be deflected by said optical discontinuity and emitted from a second location along said edge portions, and the method of sorting ones of said members bearing an optical discontinuity in a predetermined location from members bearing an optical discontinuity in a different location.

This invention relates to a new and very useful information storage and retrieval system which is particularly well adapted for storage and retrieval of micro-imaged documents.

The science of information storage and retrieval has heretofore suffered from a lack of economical, efficient systems for storing and retrieving information. Heretofore the art has known a number of card type information storage media for the storage and retrieval of information by the use of pre-determined index locations in an individual medium. Such locations are usually identified by means of holes, notches, and the like. Thus, one type of medium is known as a Hollerith card while another example is known as a McBee key sort card (a product of the Royal McBee Company). Such prior art storage media suffer from a number of disadvantages. Particularly in the case of the Hollerith card, it is impossible to make a simultaneous search through a plurality of cards arranged in a conventional deck fashion. Particularly in the case of the McBee key sort card, since a descriptor vocabulary can be stored only in the edge portions thereof, the total number of information bits which can be stored in such a card is severely limited.

In one aspect this invention relates to an information storage and retrieval system whereby a pre-determined group of alphanumeric index terms are encoded within one or more light transmissive storage media, each term encoded being represented by a specific optical discontinuity located by reference to a co-ordinate system. Thereafter individual pre-selected ones of such index terms are retrieved from such medium or media by passing collimated light through such medium or media at a pre-determined angle and at a pre-determined surface location so as to determine the presence or absence of specific optical discontinuities at specific co-ordinate index locations within such medium or media.

In another aspect, this invention relates to a new and very useful information storage medium and to means and methods for using such storage medium for information storage and retrieval. In general, the information storage medium of this invention is a mass of substantially uniformly photon transmissive material which has at least one exterior surface of predetermined shape characteristics and which further has at least one optical discontinuity therein located at a predetermined unique situs relative to said one surface.

Storage of information within such medium involves creating an optical discontinuity of known characteristics at each pre-determined index location or situs where information is to be stored. Each situs is located in a co-ordinate system usually using one or more edges of such storage medium for reference purposes. The presence or absence of an optical discontinuity at a situs in a medium can be considered to define the presence or absence of an alphanumeric index term, in accordance with a predetermined or prechosen set of terms or conditions.

By the use of collimated light and edgewise examination of a storage medium bearing stored information, information retrieval is accomplished.

A preferred system embodiment employs a plurality of storage media each in a substantially identically sized sheet-like or card form. Because each such individual medium has size characteristics substantially identical to those of all the others in the system, such a group of cards each having index terms stored therein can be stacked together face to face in deck fashion. Then, by simple visual edgewise examination of the card deck one can determine (i.e., locate) the presence or absence of a particular index term or group of such terms, as the case may be, in an individual card or cards contained in the deck. Such card or cards are then physically removed from the deck or examination of information stored in or on each card (e.g., a face thereof).

It is an object of this invention to provide an information storage medium in which a predetermined systematic distribution of optical discontinuities can be created and in which thereafter any one of such discontinuities can be located optically using an exteriorly positioned collimated light source.

It is another object of the present invention to provide a 3-dimensional, photon-transmissive information storage medium in which individual members of a pre-determined information vocabulary can each be represented by a pre-determined, unique index location within such storage medium.

It is another object of this invention to provide a storage medium from which information stored therewithin can be located optically.

It is another object of this invention to provide an information storage and retrieval system in which prepositioned optical discontinuities in a transparent or translucent plastic card format are optically locatable by light beams transversely passing therethrough.

It is another object of this invention to provide an information storage and retrieval system in which a plurality of sheet-like storage media can be searched in a parallel fashion (i.e., all cards can be searched simultaneously).

It is another object of this invention to provide a transparent, sheet-like storage medium which is internally crazable and which is adapted for edgewise visual examination using collimated light, and which is further adapted for storage of information imagewise on either or both of its opposed faces, especially microfilm images.

It is another object of this invention to provide an information storage and retrieval system from which a predetermined index term can be located by a human observer so that the human eye serves as a photo-electric sensing device, the human brain as a selector, and the human finger as an activating mechanism for physically retrieving a desired storage medium from among a deck of media.

It is another object of this invention to provide an optical memory device analogous to an electrical ferrite core memory device.

It is another object of this invention to provide a card-like information storage medium in which an optical discontinuity positioned therein representative of an information bit can be located from one dimension by optical viewing techniques.

Other and further objects of this invention will become apparent to those skilled in the art through a further reading of the specification taken together with the drawings wherein:

FIGURE 1 is a top plan view of an embodiment of a storage medium of the invention using a rectangular coordinate system for information bit storage and retrieval;

FIGURE 2 is a top plan view of another embodiment of a storage medium of the invention using a triangular coordinate system;

FIGURE 3 is a top plan view of a further storage medium embodiment using a polar coordinate system and differentially colored beams of light;

FIGURE 7 is a vertical-sectional view taken along the line 7—7 of FIGURE 5 and showing a detail of the manual card removal mechanism;

FIGURE 8 is a detailed view taken through the region 8—8 of FIGURE 7 showing the pull pin for positioning a longitudinal shutter for admitting light edgewise to the deck of cards in the apparatus shown in FIGURE 5.

Figure 4:
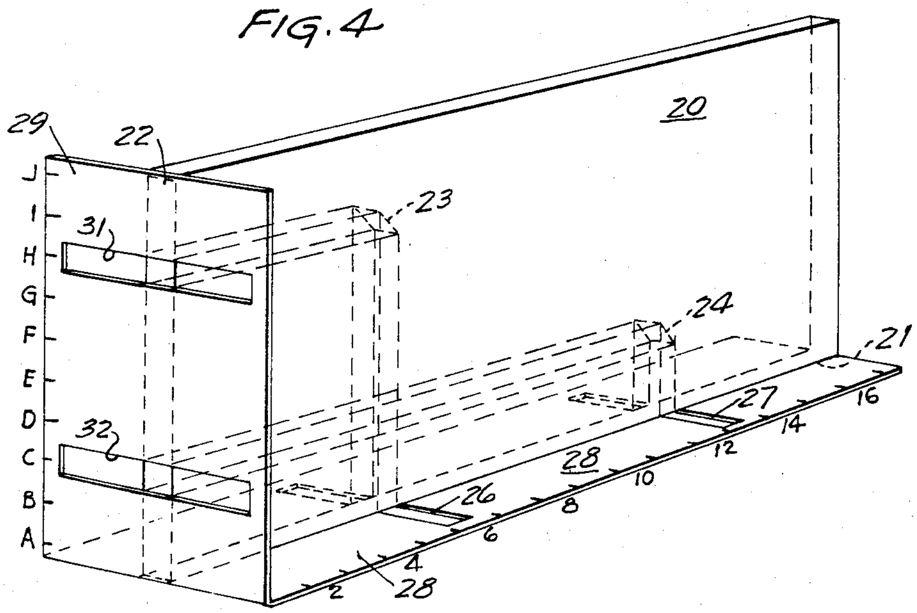
FIGURE 4 is a diagrammatic illustration of the manner in which information is stored and retrieved using a storage medium of the invention and a source of parallel light.
Figure 5:
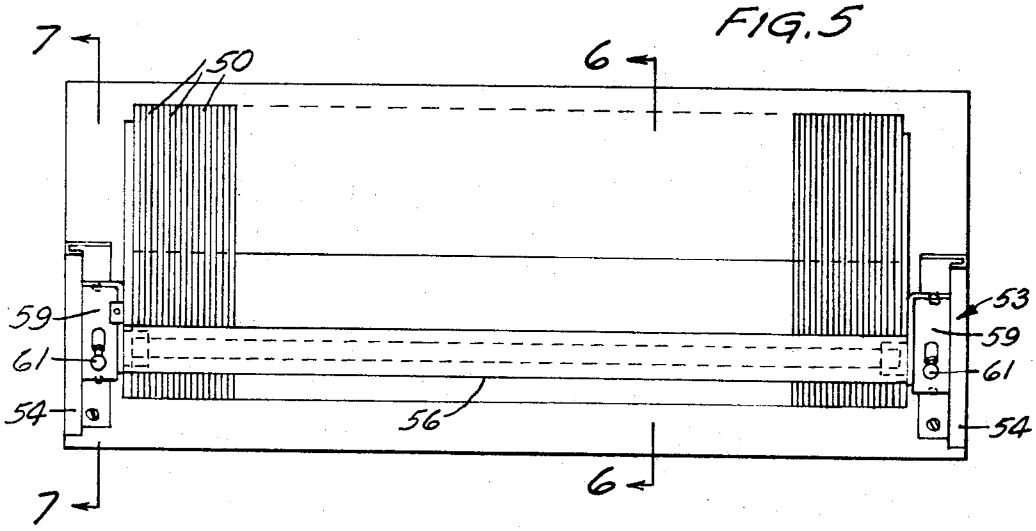
FIGURE 5 illustrates a top plan view of an apparatus for retrieving particular cards from a deck thereof using the storage media of the present invention.
Figure 6:
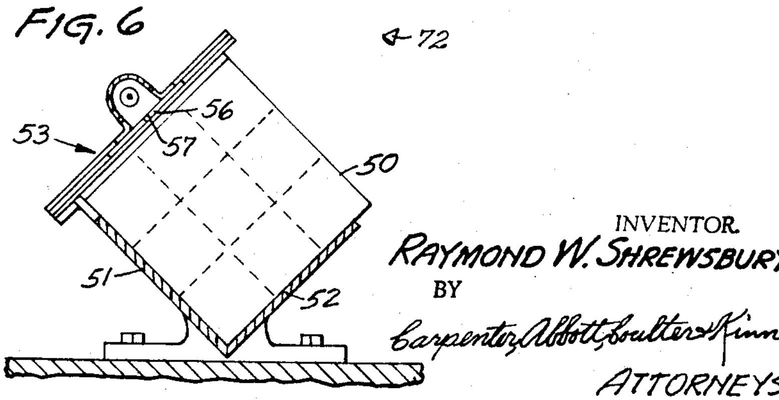
FIGURE 6 is a vertical-sectional view taken along the line 6—6 of FIGURE 5.

Storage media of this invention typically use a mass of substantially uniformly photon-transmissive material. Chemically, such material can be organic or inorganic, but organic translucent polymeric materials are preferred. In order to store information in storage media of this invention, one must incorporate into each single storage medium at least one optical discontinuity. Such optical discontinuity can be virtually of any physical or chemical nature, so long as it has predetermined different photon transmission characteristics relative to those of the material. One positions such optical discontinuity within a storage medium of the invention at a predetermined location and at a predetermined angle in reference to at least one exterior surface of such medium. Examples of various types of optical discontinuities include: cracks, holes, slots, pre-shaped foreign bodies and the like. An especially preferred form of optical discontinuity is a craze. For purposes of this invention, one especially preferred material for use in constructing storage media of this invention comprises crazable organic plastics.

A craze, for purposes of this invention, can be considered to be an opitcal discontinuity within a sheet member which will deflect incident striking light traveling generally transversely therethrough, but which is at the same time substantially invisible when a face of a crazed sheet member is observed optically from one face or the other. The phenomenon of crazing is discussed in "Stress Crazing of Some Amorphous Thermoplastics," by O. K. Spurr, Jr., and W. D. Niegisch, in the Journal of Applied Polymer Science, vol. VI, issue 23, pp. 585–599 (1962). Crazes do not have associated with them any surface physical deformation or any other measurable optical discontinuity in the overlying or underlying face of such sheet member. A particularly useful crazable organic polymeric material for use in this invention is unoriented polystyrene.

Material used in storage media of this invention is so shaped as to have at least one exterior surface of predetermined shape. Preferably storage media are sheet-like in form and, still more preferably, storage media have opposed parallel faces and a pair of straight edge portions, each such portion being positioned normally with respect to the other thereof. Most commonly, such straight edge portions are light transmissive and substantially non-diffusive of collimated light. The remaining edge portions are preferably substantially non-transmissive of photon energy.

Each such optical discontinuity is located at a fixed situs relative to such one exterior surface of predetermined shape. The optical discontinuity is adapted to alter the direction of at least a portion of collimated light incident thereon. The source of light is, in general, chosen so as to cause such portion whose direction of movement is altered to exit from a medium of the invention at a predetermined location relative to such one surface. Each optical discontinuity in combination with its associated fixed situs define an alphanumeric index term in a chosen vocabulary. An optical discontinuity is located in a storage medium of the invention by reference to a coordinate system based on at least one exterior surface of a storage medium construction.

Examples of sheet-like storage media having opposed parallel faces are shown in FIGURES 1, 2 and 3. In FIGURE 1 is seen a generally square construction. In FIGURE 2 is seen a construction in the form of an equilateral triangle. In FIGURE 3 is seen a sheet-like storage medium in the form of a hemicircle.

In the embodiments shown in FIGURES 1, 2 and 3, the light source employed for input has essentially the same frequency characteristics as the light observed in the output. Generally, a collimated light source is used. It will be appreciated by those skilled in the art that the storage media of the present invention are not limited to the use of any particular class or type of light energy as long as such light energy is reflectable by the internal optical discontinuity or discontinuities in such media and is detectable at the emergent edge. Thus, differently colored lights can be used. Especially with sheet-like media of the invention, the light source is directed at media edges. The light travels through a medium cross-wise, being, in the case of sheet-like media, commonly reflected internally from one face or the other during passage therethrough.

Referring to FIGURE 1 there is seen a preferred shape for a storage medium of this invention, which is rectangular or square. For simplicity and for illustrative purposes, the card there shown, herein designated in its entirety by the numeral 65, is divided into a total of 9 squares, the center of each square representing a single situs, the coordinate system here being rectangular. Optical discontinuities here comprise illustrative craze marks 66 and 67. Two collimated beams of light, numbered 68 and 69, respectively, enter through one edge 70, each beam 68 and 69 being normal to the edge 70 of card 65. Beam 68 proceeds until it hits the elongated craze mark 66 which is positioned at an angle of 45° both with respect to edge 70 and adjacent edge 71. When the beam 68 hits the craze mark 66 it is bent normally 90° and exits from edge 71 as beam 73. The eye 72 of a human observer can readily observe the reflected beam 73 issuing from edge 71. Similarly, when the beam 69 is reflected from the craze mark 67 (positioned similarly to craze mark 66), an observer 72 can see the reflected beam of light 74.

Those skilled in the art will appreciate, of course, that while craze marks are used for illustrative purposes in FIGURES 1–3, other forms of optical discontinuities can be used equally efficiently. Other forms of optical discontinuities include punched slots or holes, dye markings, etched marks, and the like. It will be appreciated, however, that except for craze marks most types of optical discontinuities require that that portion of a storage medium wherein the optical discontinuities appear must be dedicated for such coding purposes. Thus such portion cannot be used for storage of information on one or the other face of a sheet-like storage medium owing to the difficulties of putting information on such a medium where there are holes or the like. This problem is particularly important when one desires to store microfilm images on a face of a storage medium to be used for information storage and retrieval using optical discontinuities in accordance with the present invention. Hence, preferred optical discontinuities comprise craze marks.

One can employ multicolored light beams. For example, referring to FIGURE 2 there is seen a representation of a storage medium in triangular form. If a beam of green light normally enters the edge of the triangular card 25 there shown at C, and a beam of red light normally enters the card at E, a yellow output light blip shows at location 91.

To reflect collimated light at an angle of 120° in the illustration shown in FIGURE 2 using storage media whose edges are shaped in the form of equilateral triangles, one can employ craze marks in the shape of an inverted V (not shown), each side of the V being positioned so as to reflect light at the desired angle of 120° and produce a common output from the confluence of the two beams at a particular situs. In order to have colored light output from inputs of two different colors, it is necessary to very precisely form the inverted V shape craze mark in a storage medium as those skilled in the art will appreciate. For monochromatic light input and output type media however, less precise positioning of the reflective optical discontinuities is needed.

In FIGURE 3 is shown a storage medium using polar coordinates. Here each optical discontinuity is so positioned as to reflect light at a viewing position (as shown by the hypothetical sketched eyeball) from a plurality of entrance radial points positioned in spaced relationship to the center of curvature of the medium. In the embodiment shown in FIGURE 3 a hemicircular disk is cut out from the center and the resulting edge in the storage medium is formed into slots which admit collimated light in particular radial directions. When such a collimated beam strikes a craze mark it is reflected therefrom towards the viewing position.

By using internal reflection and two edges of a card, one for light entrance and one for light viewing, the surface area of a card is available for written or printed information. Thus there is provided a means for locating a mark in a three-dimensional phase by viewing from substantially one dimension. One is able to locate a descriptor in a storage medium of this invention in card form from using a single input source and viewing the edge of a card.

A storage medium of the invention is processed so as to have a predetermined information vocabulary recorded or stored therein. The procedure is to assign to each information bit a predetermined unique index location within such medium, so that the information bits of the vocabulary are all arrangeable systematically within a medium according to a predetermined scheme or rule. The result is a matrix or array wherein the location of each information bit of the vocabulary is definable by coordinates, e.g., by rectangular (Cartesian) coordinates, by polar coordinates, by triangular coordinates, or the like. One or more exterior surfaces of such a medium, which have predetermined shape characteristics serve as the frame of reference. It will be appreciated that storage media of this invention are not restricted to the use of any particular coordinate system such as a rectangular coordinate system.

Every index term to be encoded or recorded in a storage medium is the physical form of an optical discontinuity of predetermined characteristics. Each such optical discontinuity is chosen so as to have predetermined different photon transmission characteristics relative to those of the material comprising the body of such storage medium. Each such optical discontinuity is adapted to alter the direction of movement of at least a portion of photon energy incident thereon derived from a source of photon energy having predetermined characteristics which is positioned outside of said material so as to cause such altered portion to exit from said material at a predetermined location relative to at least one surface thereof.

Optical discontinuities can be formed in any desired way, such as by the introduction of foreign material into a storage medium, by punching holes of predetermined dimensions through a sheet-like storage medium, by slitting, by crushing, or the like. Optical discontinuities in a sheet of storage material can be made by any conventional means. One method is to make coding slits by the use of a blade-type stylus on the end of a pen-type soldering iron.

For polystyrene, the optimum tip temperature is about 200° F. Thus, for example, on a 0.020 inch thick polystyrene card, a minimum depth slit of 0.009 inch results in a good reflected light blip.

A preferred form of optical discontinuity in crazable, translucent sheet-like plastic materials, as indicated above, comprise elongated controlled craze marks. Such crazes are particularly desirable because when they are properly shaped and positioned within a given storage medium construction, they can be used for information storage and retrieval purposes without in any way appreciably interfering with the utilization of such medium for storage of material (information) upon either face thereof, for example, microfilm images. Thus, a sheet-like storage medium bearing craze marks therein can have formed on one surface thereof microfilm images which can be projected and enlarged to form conventional hard copy without any loss of resolution capability owing to the fact that a microfilm image happens to be positioned over such a craze mark. Storage media of this invention bearing controlled, elongated craze marks thus find great value for the storage and retrieval of information.

To protect the surface of a storage medium from abrasion and to provide a writing surface, paper can be laminated to either or both faces of a photon-transmissive storage medium.

To record upon a translucent sheet member of this invention one first establishes a predetermined group of descriptor terms (alphanumeric or otherwise) so as to form a prechosen descriptor vocabulary in the manner well known to those of ordinary skill in the art of information storage and retrieval. Then, each term is assigned to a particular unique location in a translucent sheet member by reference to a coordinate system. Next one creates in said sheet member an optical discontinuity at each one of the locations where such a term is to be stored in a particular storage member. Such a discontinuity is so oriented relative to one edge of a medium that when collimated light normally enters such edge portion and strikes such an optical discontinuity, a portion of said light is deflected *through a predetermined angle in the plane of the light* and exits from, typically though not necessarily, another edge portion of the medium (at a predetermined location). Commonly, the angle of deflection or reflection is about 90°.

One preferred sheet-like medium of this invention has one face thereof adapted for imagewise storage of information, such information being in addition to and separate from that represented by optical discontinuities. Thus, one face can have thereon a layer of photosensitive material for recording of light images, or a layer of opaque material such as paper adapted for the receipt of ink, or a micro-film image, etc.

The manner of using a sheet-like storage medium is better shown by reference to FIGURE 4. Here a rectangular card format similar to that described in FIGURE 1 is employed. Along two adjacent edges of the card are maintained slotted diaphragms 28 and 29, respectively, each of which has light transmissive slits formed therein. In the case of diaphragm 28 there are slits 26 and 27, while in the case of diaphragm 29 are slits 31 and 32. For convenience and reference purposes, diaphragm 28 has reference numerals 1–16 marked thereon and serves as the X-axis or abscissa whereas diaphragm 29 has units lettered respectively A through J and can be considered as the Y-axis or ordinate in a rectangular coordinate system.

For illustrative purposes, one light reflecting surface, e.g., a slit 23, is shown located at the intersection of coordinate 6 in edge 21 and coordinate H in edge 22. Similarly, a second slit 24 is shown located at the intersection of rectangular coordinate 12 and C of respective edges 21 and 22.

Normally mounted against edge 21 is a diaphragm 28 while normally mounted against edge 22 is a diaphragm 29. Observe that slits 23 and 24 are each positioned at an angle of 45° with respect to each edge 21 and 22. Opposite respective coordinates 6 and 12 in diaphragm 28 are provided respective apertures 26 and 27. Similarly, opposite respective coordinates C and H in diaphragm 29 are positioned apertures 32 and 31. Edge 21 serves as the light input edge while edge 22 serves as the viewing edge of the embodiment shown.

When a beam of light having substantially parallel rays is normally directed against diaphragm 28 and light input edge 21, two beams of light enter card 20 through edge 21 at respective coordinates 6 and 12. The beam entering at coordinate 6 proceeds until it strikes slit 23, while the beam entering at coordinate 12 proceeds until it strikes slit 24. When the beam of light which enters through coordinate 6 strikes slit 23 it is reflected by slit 23 90° and exits from edge 22 through aperture 31. Similarly, when the beam which enters through coordinate 12 strikes slit 24 it is reflected at an angle of 90° and exits through edge 22 through aperture 32.

A human observer can readily detect the light reflected from respective slits 23 and 24 through apertures 31 and 32, thereby permitting edgewise retrieval. When slits 23 and 24 are each caused to represent a separate predetermined descriptor, stored information in card 20 is thereby retrieved.

Card 20 is inserted in a deck of similar cards and exposed as above. It can readily be seen that only card 20 (or any others so coded) will produce emergent light through slots 31 and 32 and thus is easily distinguishable from all other cards in the deck.

Shown in FIGURES 5–8 is an embodiment of a machine suitable for searching and retrieving informattion from a deck of storage media in accordance with the teachings of the present invention. Employed are square storage media similar to those shown in FIGURE 1. This apparatus employs a rack 51 which is supported by a base 52. The rack 51 is adapted to hold the deck of cards herein designated in its entirety by the numeral 50 at an angle of 45° with respect to an edge thereof. Attached to one wall of rack 51 is an apertured viewing assembly herein designated in its entirety by the numeral 53. This viewing assembly includes a pair of supports 54 mounted at opposite ends of the rack 51. The supports have positioned between them an elongated plate 56 which has formed therein a transversely extending slot 57. The plate 56 has mounted at each of its opposite end portions a carriage 59 which rides in slotted grooves 60, one in each support 54 so as to adapt the plate 56 for transverse sliding movements relative to the edges of the respective cards in deck 50. A pair of simple pawls 61 permit fixing of the carriage 59 and plate 56 in any fixed predetermined position relative to the supports 54 thereby permitting the slot 57 to be located in a predetermined position over an edge of the deck 50. A light source (not shown) such as a fluorescent tube positioned immediately behind the slot 57 is adapted to admit light to and through the slot 57 in a direction normal to the edge of the deck 50 which faces toward the slot 57. A viewer as represented by the sketched eyeball 72 is then able to observe the presence or absence of a craze mark in an individual card within deck 50 if the collimated light entering through slot 57 strikes a craze mark and reflects such light towards the eyeball 72. By emitting light from the viewing assembly 53 at predetermined coordinate position, one can retrieve selectively individual bits of information stored in individual storage media of deck 50.

After one has read out descriptors by means of photon energy from storage media of the invention in accordance with the foregoing teachings, it is necessary to physically separate the desired card storage medium or media, as the case may be, from other members of the deck of card storage media searched. Such physical separation can be accomplished by any conventional means. In general, it is easier to retrieve if the object is not total rejection of the desired card, but rather dislocation of a card from a deck, thereby permitting easy manual withdrawal of such card from such deck.

In place of visual readout of craze marks, one can use an electronic device for readout; thus, in place of the human eye, one can employ an electro-optical sensing device such as a photocell, photomultiplier, or the like.

The foregoing description of media can be considered basically to describe generally two different classes of media. In one class the optical discontinuities involve a physical change in one or the other of the surfaces of a storage medium. With this class, it is necessary to dedicate a portion of one face or the other (usually both faces) of an individual sheet-like storage medium for information storage and retrieval in accordance with the invention. The portion of such a storage medium not so used for information storage and retrieval in accordance with the invention becomes available for the storage and retrieval of information by other means. Thus a portion of one face of a storage medium which is not used for information storage and retrieval can contain thereon other information in a different form.

The other class of storage media has optical discontinuities therein which in no way interfere with the utility of one or the other surfaces of a storage medium for storage of information in a different form from that involving such optical discontinuities (i.e. craze marks). A particularly preferred medium construction of this second class employs a microfilm image on one face thereof.

To prepare media constructions having microfilm images on one face or the other, one prepares a medium construction having coated on one face thereof a layer of a photosensitive material suitable for formation of microfilm images upon proper exposure and development. A particularly preferred coating is a photosensitive silver halide emulsion. Another coating is a diazo photosensitive composition. The formulation and use of silver halide emulsions and diazo compositions for use in the preparation and creation of microfilm images is well known to those of ordinary skill in the art.

In either class of card, however, it will be appreciated that one employs a card material which is transparent to light and which preferably has a pair of straight edge portions, one such portion being positioned normally with respect to the other thereof; the pair of straight edge portions each being transmissive and substantially non-diffusive of collimated light normally incident upon one of such edge portions.

Examples of other forms of information which can be stored on a face of a storage medium include microfilm images, and paper laminated to one face or the other of a storage medium. Obviously the exposed surface of the paper can bear information in any conventional form, e.g., printed or the like.

Occasionally, it is desirable to surface treat one face or the other of a translucent sheet-like plastic medium so as to enhance the capability of such face to be laminated to another material such as paper or the like. Such surface treatment can be of any conventional sort familiar to those skilled in the art.

It will be appreciated that in this specification the term "photon energy" and the term "light" are used in their conventional sense, respectively, to refer not only to visible light but also to ultraviolet and infra-red spectral energy.

While the present invention has been described above by reference to various specific illustrations, it will be appreciated that other and equivalent constructions are well within the spirit and scope of those having ordinary skill in the art and are fairly within the purview of the present specification and claims appended hereto.

Having described my invention, I claim:

1. An information storage medium comprising:

(a) a mass of substantially uniformly photon transmissive material, (b) said mass having opposed parallel faces and exterior edge portions of predetermined shape characteristics, (c) said material having defined therein at least one optical discontinuity of predetermined different photon transmission characteristics relative to those of said material, (d) each optical discontinuity being located at a fixed situs relative to said exterior edge portions, (e) each optical discontinuity being adapted to alter the direction of movement of at least a portion of light passing through said mass and incident thereon derived from a source of light of predetermined characteristics positioned outside of said material and directed at said edge portions at a first location so as to cause such portion of light whose direction of movement is altered to exit from said material at a predetermined second location relative to said edge portions, and (f) each optical discontinuity in combination with its associated fixed situs defining a descriptor term in a prefixed vocabulary.

2. An information storage medium comprising:

(a) a sheet-like solid material which is substantially uniformly transmissive of photon energy, (b) at least a portion of the edge of said material having predetermined shape characteristics, (c) said material having defined therein at least one optical discontinuity of predetermined different photon transmission characteristics relative to those of said material, (d) said optical discontinuity being located at a fixed situs relative to said edge portion, (e) said optical discontinuity being adapted to alter the direction of movement of at least a portion of light incident upon a first region of said edge portion, and (f) the interrelationship between said material and said optical discontinuity being such that said incident light is caused to exit from said edge portion at a predetermined second location.

3. An information storage medium comprising:

(a) a translucent sheet member having opposed parallel faces and a pair of straight edge portions, one portion being positioned normally with recpect to the other thereof, (b) said pair of straight edge portions each being light transmissive and substantially nondiffusive of collimated light normally incident thereupon, (c) a portion of said sheet member having defined therein at least on optical discontinuity of predetermined different photon transmission characteristics relative to those of said sheet member, (d) each such optical discontinuity being located at a situs identifiable by reference to a coordinate system based on said pair of straight edges, (e) each said optical discontinuities being so oriented relative to one of said straight edge portions that when collimated light normally enters one such straight edge portion to pass through the member between said faces and strikes such an optical discontinuity, a portion of said light is deflected at an angle substantially in the plane of said light and exits normally from such other straight edge portion.

4. The storage medium of claim 3 wherein said sheet member has a predetermined portion thereof without optical discontinuities formed therein.

5. The storage medium of claim 3 wherein a portion of one face thereof is adapted for the storage of information.

6. In a method for recording upon and retrieving information from a translucent sheet member, said member having opposed parallel faces and a pair of straight edge portions, one portion being normally positioned with respect to the other thereof, said pair of straight edge portions each being transmissive and substantially nondiffusive of collimated light normally incident thereupon, the improvement which comprises:

(a) establishing a predetermined group of descriptor terms, (b) assigning to each such term a particular unique location in said sheet member by reference to a coordinate system, based on said pair of straight edge portions, (c) creating in said sheet member an optical discontinuity at each one of said locations where a said term is to be stored, said discontinuity being so oriented relative to one of said straight edge portions that when collimated light normally enters one such straight edge portion and strikes such an optical discontinuity, a portion of said light is deflected through a predetermined angle in the plane of the light and exits from such other straight edge portion, and (d) orienting said edge portions with a source of collimated light causing said light to enter a straight edge portion and be deflected by an optical discontinuity through the other of said straight edge portions.

7. An information storage medium comprising:

(a) a crazable translucent sheet member having opposed parallel faces and a pair of straight edge portions, one such portion being positioned normally with respect to the other thereof, (b) said pair of straight edge portions each being transmissive and substantially non-diffusive of collimated light normally incident thereupon, (c) at least one elongated craze mark defined in said sheet member at a situs identifiable by reference to a rectangular coordinate system based on said pair of straight edges, and (d) each craze mark being so oriented relative to each one of said straight edge portions that when collimated light normally enters one such straight edge portion and strikes such a craze mark, at least a portion of said light is deflected at an angle substantially in the plane of said collimated light and exits from such other straight edge portion.

8. An information storage medium comprising:

(a) a crazable translucent sheet member having opposed parallel faces and a pair of straight edge portions, one such portion being positioned normally with respect to the other thereof, (b) said pair of straight edge portions each being transmissive and substantially non-diffusive of collimated light normally incident thereupon, (c) at least one elongated craze mark defined in said sheet member at a situs identifiable by reference to a rectangular coordinate system based on said pair of straight edges, (d) each said craze mark being so oriented relative to each one of said straight edge portions that when collimated light normally enters one such straight edge portion and strikes such a craze mark, a portion of said light is deflected about 90° thereby and exits normally from such other straight edge portion, and (e) said sheet member having coated on one surface thereof a layer of light sensitive photographic silver halide emulsion.

9. An information storage medium comprising:

(a) a crazable translucent sheet member having opposed parallel faces and a pair of straight edge portions, one such portion being positioned normally with respect to the other thereof, (b) said pair of straight edge portions each being transmissive and substantially non-diffusive of collimated light normally incident thereupon, (c) at least one elongated craze mark defined in said sheet member at a situs identifiable by reference to a rectangular coordinate system based on said pair of straight edges, (d) each said craze mark being so oriented relative to each one of said straight edge portions that when collimated light normally enters one such straight edge portion and strikes such a craze mark, a portion of said light is deflected about 90° thereby and exits normally from such other straight edge portion, and (e) said sheet member having deposited on one face thereof a microfilm image.

10. An information storage medium comprising:

(a) a crazable translucent sheet member having opposed parallel faces and a pair of straight edge portions, one such portion being positioned normally with respect to the other thereof, (b) said pair of straight edge portions each being transmissive and substantially non-diffusive of collimated light normally incident thereupon, (c) at least one elongated craze mark defined in said sheet member at a situs identifiable by reference to a rectangular coordinate system based on said pair of straight edges, (d) each said craze mark being so oriented relative to each one of said straight edge portions that when collimated light normally enters one such straight edge portion and strikes such a craze mark, a portion of said light is deflected about 90° thereby and exits normally from such other straight edge portion, (e) one face of said sheet member having a portion thereof coated with a layer of opaque material adapted for the receipt of ink, and (f) said layer of opaque material having information imprinted in ink thereon.

References Cited

UNITED STATES PATENTS

| | | | |
|---|---|---|---|
| 2,953,300 | 9/1960 | O'Brian et al. | 235—61.12 |
| 3,186,111 | 6/1965 | Lawlor. | |

MAYNARD R. WILBUR, *Primary Examiner.*

S. SHEINBEIN, *Assistant Examiner.*

U.S. Cl. X.R.

129—16.1; 235—61.115